June 29, 1926.  1,590,436
C. LE G. FORTESCUE ET AL
COMBINED EXCITING AND DAMPER WINDING FOR DYNAMO ELECTRIC MACHINES
Filed Dec. 13, 1922
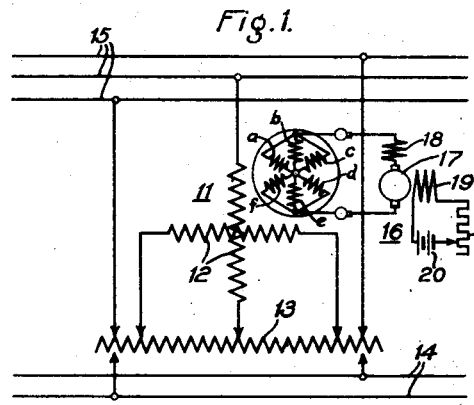
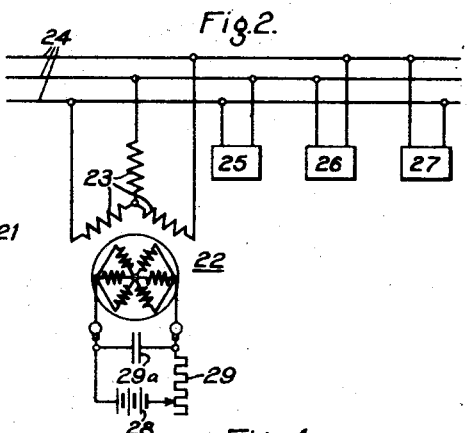
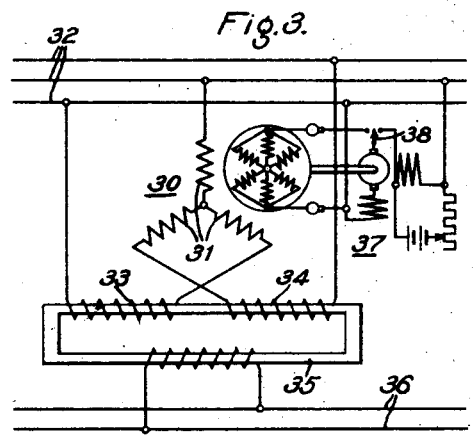
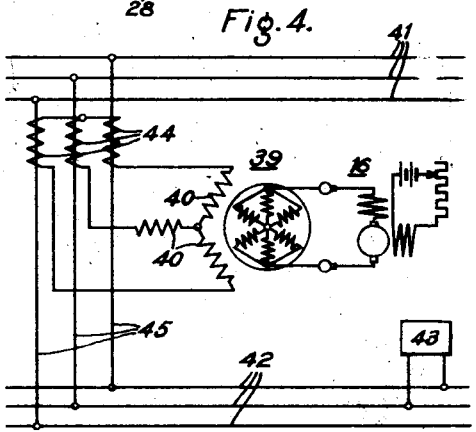
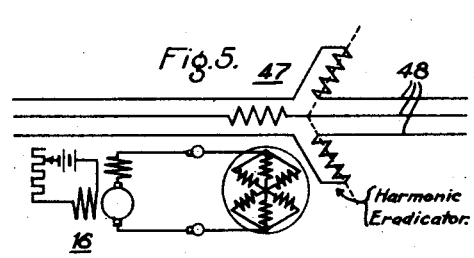
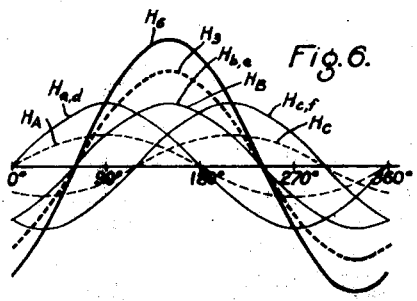
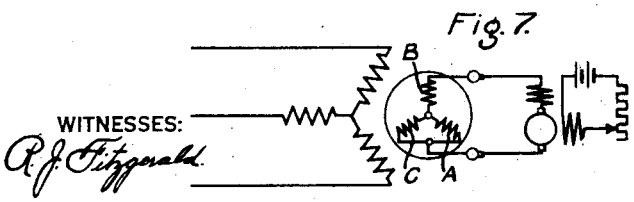
WITNESSES:
INVENTORS
Charles LeG. Fortescue
and Herbert G. Jungk.
BY
ATTORNEY Patented June 29, 1926.

1,590,436

UNITED STATES PATENT OFFICE.

CHARLES LE G. FORTESCUE AND HERBERT G. JUNGK, OF PITTSBURGH, PENNSYLVANIA, ASSIGNORS TO WESTINGHOUSE ELECTRIC & MANUFACTURING COMPANY, A CORPORATION OF PENNSYLVANIA.

COMBINED EXCITING AND DAMPER WINDING FOR DYNAMO-ELECTRIC MACHINES.

Application filed December 13, 1922. Serial No. 606,577.

Our invention relates to dynamo-electric machines having exciting and damper windings, and it has particular relation to phase converters, phase balancers, harmonic eradicators, and other machines adapted to have a very high impedance to currents of one frequency or phase sequence while permitting the flow of currents of other frequencies or phase sequence.

The principal object of our invention is to provide a machine of the character just mentioned having a single secondary winding which is so arranged and connected that it may be employed, to the best advantage, as a combined damper winding and exciting winding.

Referring to the accompanying drawing for a more complete understanding of the invention, Figure 1 is a diagrammatic view showing our invention applied to a shunt phase converter.

Fig. 2 is a similar view showing the invention applied to a shunt phase balancer.

Figs. 3 and 4 are similar views showing the invention applied to a series phase converter and a series phase balancer, respectively, Fig. 5 is a similar view showing the invention applied to a harmonic eradicator, Fig. 6 is a curve diagram explanatory of the distribution of the direct-current fields, and Fig. 7 is a view showing a machine of the type described having a three-phase combined damper and exciter winding.

A single-phase vector, or a system of unbalanced polyphase vectors, may be resolved into two systems of balanced polyphase vectors rotating in opposite directions or having opposite phase sequences. In the case of a single-phase system the symmetrical polyphase components are equal in magnitude. In the case of an unbalanced polyphase system, particularly, an unbalanced three-phase or quarter-phase system, there is a major balanced polyphase component having the same phase sequence as the unbalanced system and a minor balanced component of the opposite phase sequence.

The purpose of a shunt phase balancer, or of a shunt phase converter, is to offer as low an impedance as possible to the minor balanced component, or to one of the components of the single-phase system, while offering a very high or "synchronous" impedance to the other balanced component. It is usually desirable to excite the shunt balancer or converter either for the purpose of reducing, to a minimum, the forwardly rotating component currents drawn from the line, or for the purpose of supplying forwardly rotating wattless currents to the line for power-factor correction. The backwardly rotating component currents produce double-frequency currents in the secondary winding of the shunt-connected machine, and the impedance offered by the machine to such backwardly rotating currents in the primary is dependent upon the closeness of the magnetic coupling and the freedom with which the double-frequency currents are circulated in the damper winding.

If the balancer or converter machine is connected in series between a balanced polyphase line and an unbalanced polyphase line, or between a balanced polyphase line and a single-phase transformer, the machine is driven, or permitted to operate by itself, in the opposite direction, whereby the machine will permit the flow of current of the desired phase sequence while offering a high impedance to the other component current. In this case, it is desirable to excite the series machine in accordance with the electromotive force of the eradicated component currents. The damper windings of the series eradicator machine carry double-frequency currents proportional to the load currents passing through the machine.

The series eradicator machine may be employed also for the purpose of eradicating any other currents than the backwardly rotating component of an unbalanced system, since the eradicator machine may be operated at a speed corresponding to the frequency of any harmonic current in the line and in a direction of rotation corresponding to the phase-sequence of the eradicated current. In this case, the series machine may be either single-phase or polyphase. The damper-winding currents will have a frequency depending upon the relative speed of the damper winding with respect to the field produced by the load currents in the primary winding.

In machines of the class described, the space available in the secondary members is utilized to the best advantage by employing a single winding for carrying both the damper currents and the exciting currents, whereby the space ordinarily necessary for the insulation between the damper winding and the exciting winding is saved. We have employed two systems for utilizing a single winding as a combined damper and exciting winding and we shall describe both for the purpose of comparison. Prior to our conception of the present invention we employed a star-connected, three-phase damper winding, as shown at A, B and C in Fig. 7, phase B being connected to one terminal of the exciting source and phases A and C being connected together and to the other terminal of the exciting source.

According to our present invention, we employ a star-connected six-phase secondary winding, $a$, $b$, $c$, $d$, $e$ and $f$, shown in Fig. 1, said winding having three adjacent phases connected together and to one terminal of the exciter, and the three remaining phases connected together and to the other terminal of the exciter. The two systems of combined damper and exciting windings will now be compared in order to facilitate the explanation of the nature and advantages of our present system.

The heating in the secondary windings is proportional to the sum of the squares of the exciting currents and the damper currents. Since the damper electromotive forces are always balanced, the magnitude of the total exciting currents is determined by the maximum exciting component in any phase of the secondary winding. In the three-phase secondary winding shown on Fig. 7, the total exciting current passes through phase B, and exciting currents of one-half magnitude flow through the phases A and C. In our present plan, we have the exciting currents divided equally, whereby the same heating is produced in all of the phases of the six-phase secondary winding.

Fig. 6 shows the comparative flux distributions of the two systems, with the same maximum exciting current flowing in any phase of the secondary winding, and with the same total number of turns in the entire secondary winding. The curve $H_{a,d}$ represents the flux which would be produced by the diametrical phases $a$, $d$ of the six-phase winding shown in Fig. 1. Similarly the curves $H_{b,e}$ and $H_{c,f}$ show the flux distributions for the other diametrical phases of the six-phase secondary winding.

The resultant exciting flux is shown by the heavy line $H_6$.

With the three-phase winding shown in Fig. 7, the ampere turns available in phase B are the same as those resulting from the phases $b$ and $e$, as indicated at $H_B$ in Fig. 6. The ampere turns available in phases A and C of Fig. 7 are only half of the ampere turns produced in the corresponding windings $a$, $d$ and $c$, $f$, respectively, of the six-phase winding, as indicated by the dotted curves $H_A$ and $H_C$, respectively, in Fig. 6. The resultant direct-current excitation in the three-phase winding is indicated by the heavy dotted line $H_3$.

It is thus apparent that the six-phase connection, shown in Fig. 1, produces a maximum possible direct-current excitation, and it represents a thirty-three per cent increase in flux, for the same total exciting current, as compared with the best available system which we knew prior to the conception of our present invention.

The drawings show our invention applied, by way of suggestion, to a number of combinations. In Fig. 1 is shown a shunt phase converter 11 having a secondary winding arranged as a star-connected six-phase winding $a$, $b$, $c$, $d$, $e$, $f$, according to our invention. The phase converter 11 is shown as having a two-phase primary winding 12, connected to interchange power between a single-phase transformer winding 13, connected across a single-phase line 14, and a polyphase line 15. It is not essential that the primary winding 12 shall be a two-phase winding, instead of a three-phase winding, the two-phase connection being illustrated, since it usually works out with a small saving in copper over the three-phase connection, in the practical design of the machine.

An exciter 16 is shown as a separately excited machine of the single-phase commutator-motor type having an armature winding 17, a neutralizing winding 18, and an exciting winding 19, the latter being energized from a direct-current source 20, through a rheostat 21. The neutralizing winding 18 is ordinarily necessary to reduce the reactance of the exciter to double-frequency currents. Moreover, the neutralizing winding 18, under some circumstances, may assist the flow of damper currents of higher frequency resulting from the presence of harmonics. Our invention is obviously not limited to the exact details of the exciting source, and it is to be understood that any desired form of direct-current source may be employed.

In Fig. 2, the invention is shown as being applied to a shunt phase balancer 22, having a three-phase primary winding 23, connected across an unbalanced polyphase line 24, the unbalancing being indicated symbolically by means of the three single-phase translating devices 25, 26 and 27, connected across the respective phases of the polyphase line. The secondary winding is shown, in this case, as being excited by means of a battery 28 and a rheostat 29, shunted by a condenser 29ª for by-passing the double-frequency damper currents.

The machine of Fig. 2 is capable of operation as a phase balancer, as just described, but it is also capable of operation as a synchronous converter, motor or generator, and it is obviously capable of performing the last-mentioned functions whether the line is balanced or unbalanced.

The machine shown in Fig. 2, as well as the machines shown in all of the other figures of this disclosure, differs from an ordinary synchronous machine in having a very small air gap, in having a most perfect damper winding which takes up all of the available space on the secondary member to the exclusion of other windings, and in having a secondary core which is never provided with salient poles. In brief, our machine, in its broadest structural aspect, is simply an ordinary induction motor provided with a star-connected secondary winding having any even number of phases, the terminals of the secondary windings being short-circuited in two diametrically opposite groups and said groups being respectively connected to two slip rings for direct-current excitation.

In Fig. 3, the invention is illustrated as being applied to a series phase converter 30, having a three-phase primary winding 31, which is connected in series between a three-phase line 32, and two transformer windings, 33 and 34, of a single phase transformer 35, which is connected across a single-phase line 36. An exciter 37 is shown, in this case, as a machine similar to the exciter 16 of Fig. 1, the same being mounted upon the shaft of the phase converter 30, and being provided with a starting switch 38, whereby the exciter may be utilized as a single-phase commutator motor for starting the phase converter.

In Fig. 4, our invention is shown as being applied to a series phase balancer 39, having a primary winding 40, connected in series circuit relation between a balanced polyphase line 41, and an unbalanced polyphase line 42, the unbalancing being symbolized by a single-phase translating device 43. The series phase balancer may be either connected directly in series between the two lines 41 and 42, or, as shown, the series relation may be obtained through current transformers 44 connected in the conductors 45 which tie together the two lines.

In Fig. 5, the invention is shown applied to a harmonic eradicator 47, having a polyphase primary winding which is connected in series with a polyphase line 48. In this case, it is supposed that there are harmonic currents or electromotive forces in the polyphase line on one side of the eradicator and that it is desired to eliminate such currents from the rest of the line. The harmonics may be originated from any source, not material to the present invention, such, for instance, as harmonics generated in an alternator or in a transformer connection, or drawn by a load having harmonics, such, for example, as a rectifier load.

The eradicator is operated at a speed corresponding to the frequency of the harmonic to be eradicated and in the direction of rotation corresponding to the phase sequence of the eradicated currents. By way of illustration, the six-phase secondary windings 49 are shown without a connection at the star point, since such connection, while desirable, is not absolutely essential.

In every case, the primary and secondary windings should preferably be chorded in such manner as to eliminate, as far as possible, all harmonic currents due to the flux distribution about the armature, in accordance with the usual practice.

While we have illustrated two types of direct-current source for exciting the secondary windings, it will be obvious that we are not limited to any particular source but that either of the sources shown could be employed, under suitable circumstances, with any of the combinations shown in the drawing, or other forms of direct-current source could be substituted.

While we have employed the terms "single-phase line" and "polyphase line" in the above discussion, it is to be understood that any kind of single-phase translating device, or polyphase translating device, or combination of such devices is contemplated.

It will be obvious to those skilled in the art that our invention, in its broadest aspects, is not limited to any of the circuit diagrams suggested for illustrative purposes in the foregoing specification, and that many changes and substitutions may be made without departing from the spirit of our invention. We desire, therefore, that the language of the following claims shall be given the broadest interpretation consistent with the state of the prior art.

We claim as our invention:

1. A single-pole-number alternating-current machine for offering a high impedance to currents of one frequency or phase sequence while offering a low impedance to the flow of currents of other frequencies or phase sequence, said machine having primary and secondary members separated by a small air gap, said secondary member being provided with a star secondary winding having an even number of phases, means for short-circuiting the phases of said secondary winding in two diametrically opposite groups, and an external terminal connection for each of said two groups.

2. A single-pole-number synchronous alternating-current machine having primary and secondary members separated by a small air gap, said secondary member being provided with an effectively chorded star-connected six-phase secondary winding having adjacent phase terminals connected together in two diametrically opposite groups, and an exciting source connected to said groups.

In testimony whereof, we have hereunto subscribed our names this 6th day of December, 1922.

CHARLES LE G. FORTESCUE.
HERBERT G. JUNGK.